US006718766B2

(12) United States Patent
Seto et al.

(10) Patent No.: US 6,718,766 B2
(45) Date of Patent: Apr. 13, 2004

(54) PUMP-INTEGRATED FLEXIBLE ACTUATOR

(75) Inventors: Takeshi Seto, Chofu (JP); Kunihiko Takagi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 20 days.

(21) Appl. No.: 09/979,177

(22) PCT Filed: Mar. 2, 2001

(86) PCT No.: PCT/JP01/01660

§ 371 (c)(1),
(2), (4) Date: Nov. 20, 2001

(87) PCT Pub. No.: WO01/72479

PCT Pub. Date: Oct. 4, 2001

(65) Prior Publication Data

US 2002/0157388 A1 Oct. 31, 2002

(30) Foreign Application Priority Data

Mar. 28, 2000 (JP) ........................................ 2000-089581

(51) Int. Cl.[7] ............................. B25J 15/08; F15B 15/18
(52) U.S. Cl. ............................. 60/572; 60/476; 91/525; 92/48
(58) Field of Search ........................ 60/476, 571, 572; 91/196, 210, 525; 92/5 R, 48, 90, 91, 92

(56) References Cited

U.S. PATENT DOCUMENTS

| 3,083,534 A | | 4/1963 | Bergounhon et al. | |
|---|---|---|---|---|
| 3,979,910 A | * | 9/1976 | Leuenberger et al. | ......... 60/476 |
| 4,811,562 A | * | 3/1989 | Hoffmann et al. | ............ 60/476 |
| 5,385,080 A | * | 1/1995 | Suzumori | .................. 92/171.1 |

FOREIGN PATENT DOCUMENTS

| DE | 198 21 489 A1 | | 12/1999 | |
|---|---|---|---|---|
| EP | 0 113 145 A1 | | 7/1984 | |
| EP | 0 437 792 A1 | | 7/1991 | |
| GB | 2 207 702 A | | 2/1989 | |
| JP | A-4-111792 | | 4/1992 | |
| JP | A-5-164112 | | 6/1993 | |
| JP | A-5-172118 | | 7/1993 | |
| JP | 05172118 A | * | 7/1993 | ........... F15B/15/10 |
| JP | 05280500 A | * | 10/1993 | ............ F04F/11/00 |
| JP | A-5-280500 | | 10/1993 | |

* cited by examiner

Primary Examiner—Thomas E. Lazo
(74) Attorney, Agent, or Firm—Oliff & Berridge, PLC (57) ABSTRACT

A pair of flexible actuators according to the present invention is supported by a fixture made of a hard rubber at base ends of the flexible actuators. Each flexible actuator includes a movable unit that is capable of bending, a pump unit integrally connected to the movable unit at an end thereof, to control transfer of work fluid sealed in the movable unit, and a pump driver that controls driving of the pump unit. The movable unit includes two long and narrow tubes that each have an accordion wall, a core that maintains the tubes in parallel with each other, and a thin-film-bag-like cover that covers the tubes. The tube, which comes into contact with an object, is made of a soft material. The movable unit that is provided with the tube softly comes into contact with the object at a plurality of plane-contact portions of action of the movable unit, thereby holding the object without scratching the same.

18 Claims, 9 Drawing Sheets

PUMP-INTEGRATED FLEXIBLE ACTUATOR

BACKGROUND OF THE INVENTION

1. Field of Invention

The present invention relates to a pump-integrated flexible actuator, such as one that can be used in a pet robot which is generally in contact with human beings, a work robot used to perform agricultural tasks, such as holding pieces of fruit which have irregular shapes and which are likely to be damaged, as well as various other varied uses.

2. Description of Related Art

An actuator that holds objects is known, which is disclosed in, for example, Japanese Unexamined Patent Application Publication Nos. 5-172118 and 5-164112, in which a cylindrical elastic member that includes a plurality of pressure chambers is provided. The cylindrical elastic member is bent by controlling fluid pressure which acts on each pressure chamber, thereby holding or pressing the object (this art is hereinafter referred to as a "first related art").

An actuator that is different from the first related art is disclosed in, for example, Japanese Unexamined Patent Application Publication No. 2-17204, in which a driving source and a pump are assembled in a hydraulic cylinder (this art is hereinafter referred to as a "second related art").

Since the cylindrical elastic member that is included in the actuator according to the first related art is soft, the actuator can softly contact human beings and objects.

However, this actuator must be provided with a pump for supplying work fluid and piping for feeding the work fluid to the pressure chambers that are disposed outside of the cylindrical elastic member. Therefore, there is a problem in that the size of the actuator increases. There is another problem in that the pipes block the movement of joints of a robot when the robot uses this actuator as, for example, an arm. Therefore, it is difficult to use the actuator for a pet robot or the like because the robot must be provided with a number of sensors and complex mechanisms, since delicate movements that are similar to those of a living creature are required of such a pet robot.

The actuator according to the second related art, in which a pump and piping are not exposed to the exterior, cannot softly contact human beings and objects because driving members, such as a piston rod, are hard. It is therefore difficult to use the actuator for a pet robot or an agricultural work robot for holding pieces of fruit and other objects.

SUMMARY OF THE INVENTION

Accordingly, it is an object of the present invention to provide a pump-integrated flexible actuator, in which the size of the actuator, which has a simple configuration, is reduced. It is also an object of the invention to provide an actuator that softly contacts human beings when the actuator is used as a pet robot, and that can reliably hold objects when the actuator is used as an agricultural work robot.

The present invention provides a pump-integrated flexible actuator which includes a movable unit provided with a plurality of fluid chambers that have fluid sealed therein, the movable unit being movable with the fluid chambers being deformed by a transfer of the fluid between the fluid chambers; a pump unit integrated with the movable unit, that transfers the fluid between the plurality of fluid chambers; and a pump driver that controls driving of the pump unit. The plurality of fluid chamber that have fluid sealed therein are preferably disposed parallel to each other. According to the invention, an actuator having a simple configuration and a reduced size, in which a movable unit of the actuator is capable of operation, is obtainable.

The movable unit is preferably provided with at least one long and narrow deformable tube that forms the plurality of fluid chambers that have fluid sealed therein, and a flexible core disposed parallel to the tube, that restricts expansion of the tube in a longitudinal direction thereof. The movable unit is preferably provided with at least two long and narrow tubes, which are capable of expansion and contraction, disposed parallel to each other, each tube forming the fluid chamber, and a flexible core disposed between the tubes, that restricts expansion of each tube in a longitudinal direction thereof. According to the invention, the movable unit can be reliably deformed in a manner that is similar to a living creature because the core restricts expansion in a longitudinal direction of each tube and allows expansion in a widthwise direction thereof when the core bends while maintaining the tubes in parallel with each other.

The tube, which is disposed at a side of the movable unit to be brought into contact with an object when a pressing force and a holding force of the movable unit act on the object, is preferably made of a soft and elastic material. According to the invention, the object can be pressed and held without being scratched because the tubes are made of a soft material and contact the object softly in a state in which a plurality of plane-contact portions of action are provided.

When a soft member covers the pump unit, the actuator becomes safer because hard parts are not exposed to the exterior.

The fluid that is sealed in the fluid chambers is preferably a liquid, and an outer cover having a liquid-absorbing function preferably covers the movable unit at the periphery thereof. According to the invention, the liquid does not leak to the exterior because it is absorbed by the outer cover even when the liquid leaks from the movable unit.

The pump-integrated flexible actuator preferably further includes a depressurization mechanism which reduces inner pressure of one of the plurality of fluid chambers by having the plurality of fluid chambers communicate with each other when the inner pressure of the one of the plurality of fluid chambers increases to an abnormal level. According to the invention, when an excessive external force is applied to the movable unit and pressure in one of a plurality of the fluid chambers is thereby increased to an abnormal level, the depressurization mechanism reduces the increased pressure in the fluid chamber, thereby avoiding explosion of the fluid chamber, whereby a fail-safe mechanism against an excessive external force can be provided.

The core is preferably formed with a signal wire or an electrical wire connected between the pump unit and the pump driver. According to the invention, the signal wires and the electrical wires are prevented from becoming damaged, which enables electric shocks and the like to be avoided.

The pump driver is preferably disposed in the movable unit which seals liquid therein so that the pump driver is in contact with the liquid. According to the invention, the pump driver is cooled because heat generated by the pump driver is absorbed by the liquid, and a more compact actuator is obtainable by virtue of the pump driver disposed inside the movable unit.

The pump-integrated flexible actuator preferably further includes a reservoir that stores a predetermined amount of fluid; and a supply member that controls supply of the fluid stored in the reservoir to each fluid chamber of the movable unit. According to the invention, the work fluid in the reservoir is supplied into the fluid chambers by operating the supply member and the inner pressure of the fluid chambers is thereby increased, whereby the movable unit can be made to be rigid. With this arrangement, when the actuator is used as a component for, for example, a pet robot, the actuator can move into a state in which the pet robot is tense other than the state in which the actuator is bent with an operation of the pump unit.

Two pump units are preferably integrated with the movable unit at respective longitudinal ends of the movable unit, and the two pump units preferably simultaneously operate to transfer fluid between the plurality of fluid chambers. According to the invention, the actuator can be moved quickly by increasing the bending speed of the movable unit with the two pump units transferring the fluid between a plurality of the fluid chambers.

Each pump unit is preferably provided with a detachable connecting part, such that when a pair of the movable units are connected to each other in series, the movable unit is connected to the other movable unit at the pump unit of each movable unit. According to the invention, a pair of the flexible actuators can be mounted to and removed from, each other through a one-touch operation, whereby a device, that is capable of an easy dismounting operation with respect to the actuators is obtainable.

The pump unit preferably includes a diaphragm which defines a pump fluid chamber between an end of the movable unit and the pump unit. A piezoelectric element is preferably laminated on the diaphragm. The pump unit is preferably provided with a valve that sets a direction of the transfer of fluid between one tube that forms the fluid chamber and another tube that forms the other fluid chamber via the pump fluid chamber.

According to these inventions, a more compact actuator that is lighter can be provided by virtue of the pump unit reduced in size.

The pump unit preferably includes the same number of unidirectional-flow-type pumps as the number of fluid chambers. Each fluid chamber communicates with one unidirectional-flow-type pump which transfers fluid from the fluid chamber to another fluid chamber and another unidirectional-flow-type pump which transfers the fluid from another fluid chamber to the fluid chamber. According to the invention, an actuator can be provided in which a bidirectional operation, which is performed by using a bidirectional-flow-type pump and a direction-switching valve, is made possible by only using unidirectional-flow-type pumps that have a simple configuration.

The plurality of fluid chambers are preferably each provided with a pressure sensor, and the pump driver preferably computes an actual operational force of the movable unit according to determination by the pressure sensors and controls driving of the pump unit. According to the invention, the pressure sensor detects the fluid in each fluid chamber and the operational force of the movable unit is controlled, so that the movable unit operates with an optimum operational force, according to pressure data, whereby the movable unit can operate at a high accuracy.

The plurality of fluid chambers are preferably each provided with an acoustic wave generator that generates acoustic waves and an acoustic wave sensor that senses the acoustic waves, and the pump driver preferably computes an actual amount of displacement of the movable unit according to a determination by the acoustic wave sensors and controls driving of the pump unit. According to the invention, the movable unit is controlled so as to be moved by an optimum amount of displacement according to a determination by the acoustic wave sensor which determines the propagation time and the phase of the acoustic waves generated in the fluid chambers, whereby the movable unit can operate at a high accuracy.

The pump unit preferably includes a diaphragm which defines a pump fluid chamber. Variation in current generated when a pressure is applied to the diaphragm which is applied with a voltage is preferably inputted to the pump driver. The pump driver preferably computes an actual operational force of the movable unit according to determination of the variation in current that controls driving of the pump unit. The pump unit may include a diaphragm which defines a pump fluid chamber, a plurality of the fluid chambers may each be provided with an acoustic wave sensor that senses acoustic waves generated by the diaphragm, and the pump driver may compute an actual amount of displacement of the movable unit according to a determination by the acoustic wave sensors that control driving of the pump unit.

According to the invention, the operational force and the displacement of the movable unit are controlled by using a diaphragm, whereby a simple control-mechanism can be provided.

The pump driver preferably includes a table that computes an operational force and displacement of the movable unit from the determined acoustic waves and pressure. The propagation time or the phase of the acoustic waves, which the acoustic sensor determines, differs between cases where the movable unit applies the operational force to the exterior and where the movable unit does not apply the operational force to the exterior. Therefore, according to the present invention, the pump driver is provided with a table that computes the operational force and the amount of displacement of the movable unit from the determined acoustic waves and the pressure. With this arrangement, the pump driver can control the movable unit by referring to the table so that the movable unit moves by an optimum displacement amount according to the cases where the movable unit does not apply the operational force and where the movable unit applies the operational force. Therefore, the operational force can be controlled to be constant in any displacement state of the movable unit.

The movable unit preferably includes a light generator and a light receiver that oppose each other, or a light generating/receiving member and a reflector that oppose each other, and an actual operational force of the movable unit is preferably computed in accordance with determination by either the light receiver or the light generating/receiving member so that drive of the pump unit is controlled.

According to the invention, the operational force and the displacement of the movable unit are controlled by using either a light generator and a light receiver or a light generating/receiving member and a reflector, whereby a simple control mechanism can be provided.

The pump driver preferably includes a table that computes an operational force and displacement of the movable unit from an amount of light which is determined by the light receiver or the light generating/receiving member.

According to the invention, the pump driver is provided with a table that computes an operational force and displacement of the movable unit from a determined light amount, whereby the pump driver can control the movable unit so that an optimum displacement of the movable unit is obtainable, by referring to the table, either when the operational force of the movable unit is applied or when the operational force thereof is not applied.

DETAILED DESCRIPTION OF THE PREFERRED EMBODIMENTS

Embodiments of a pump-integrated flexible actuator according to the present invention are described below with reference to the drawings.

Figure 1:
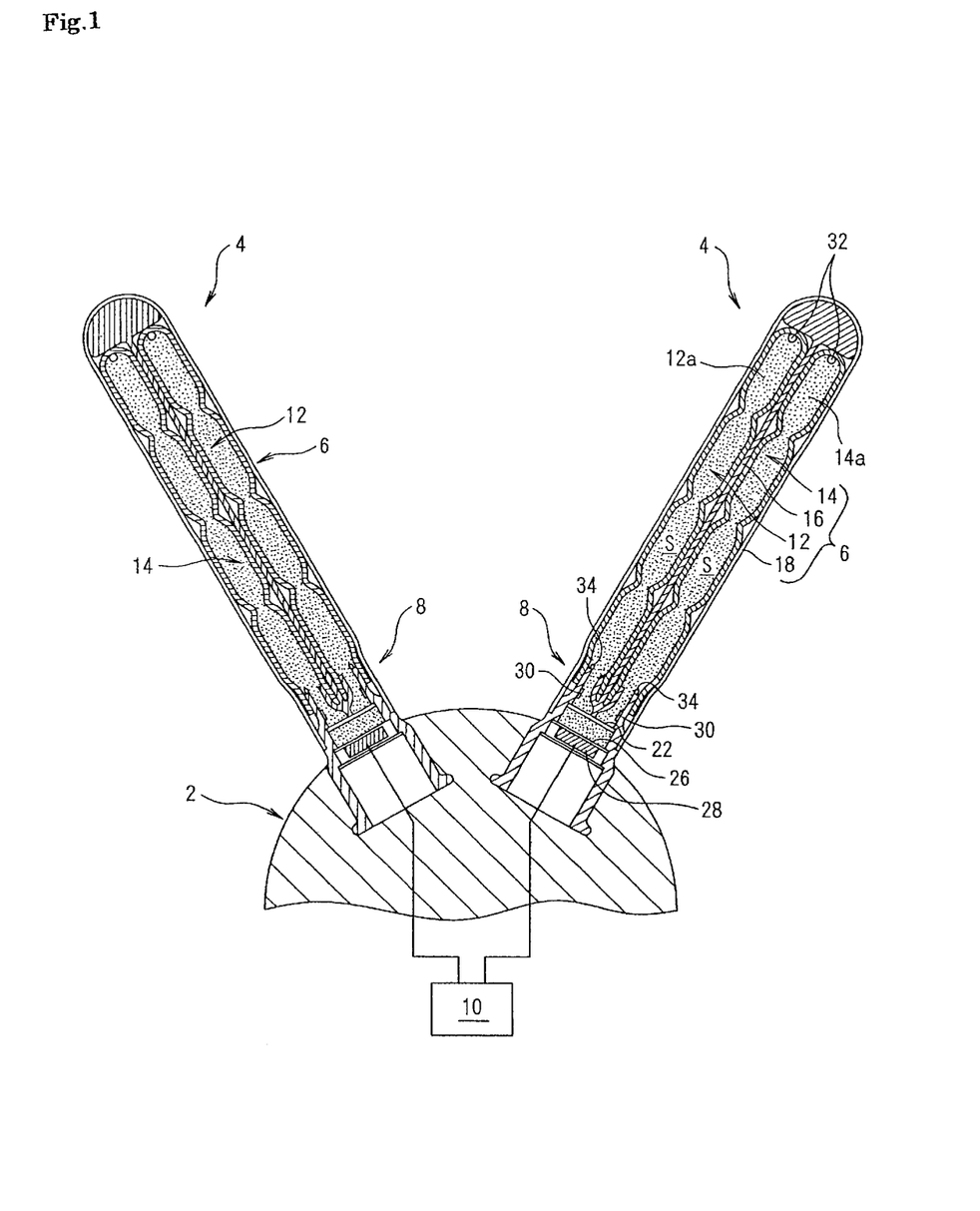
FIG. 1 is a sectional view of flexible actuators according to a first embodiment of the present invention, which form artificial fingers for agricultural use.

FIG. 1 shows a pair of flexible actuators 4, according to a first embodiment, that can be used, for example, as artificial fingers for agricultural use, which are supported by a fixture 2 made of a soft rubber at base ends of the flexible actuators 4.

The pair of flexible actuators 4 each includes a movable unit 6 that is capable of bending to hold an object, a pump unit 8 integrally connected to an end of the movable unit 6, that controls movement of a low-viscosity work fluid sealed in the movable unit 6, and a pump driver 10 that controls driving of the pump unit 8. Each movable unit 6 is formed with long and narrow tubes 12 and 14 having accordion walls, a core 16 that maintains the tubes 12 and 14 in parallel with each other, and a thin-film-bag-like cover 18 that covers the tubes 12 and 14.

The tubes 12 and 14 are made of a soft and flexible material, and form fluid chambers 12a and 14a, respectively, which seal work fluid S therein. The core 16 is, for example, a flexible steel member which restricts expansion of the tubes 12 and 14 in a longitudinal direction thereof and allows expansion of the tubes 12 and 14 in a widthwise direction thereof. A slit 16a, which is normally closed, is formed in an end of the core 16, as shown in an expanded view of critical portions of the movable unit 6 and the pump unit 8 shown in FIG. 2. The slit 16a, which is normally closed by an elastic resilience of the core 16, opens for communication between the fluid chambers 12a and 14a, when a predetermined pressure is produced, so as to reduce pressure in the fluid chamber 12a or 14a below a permissible value.

Figure 2:
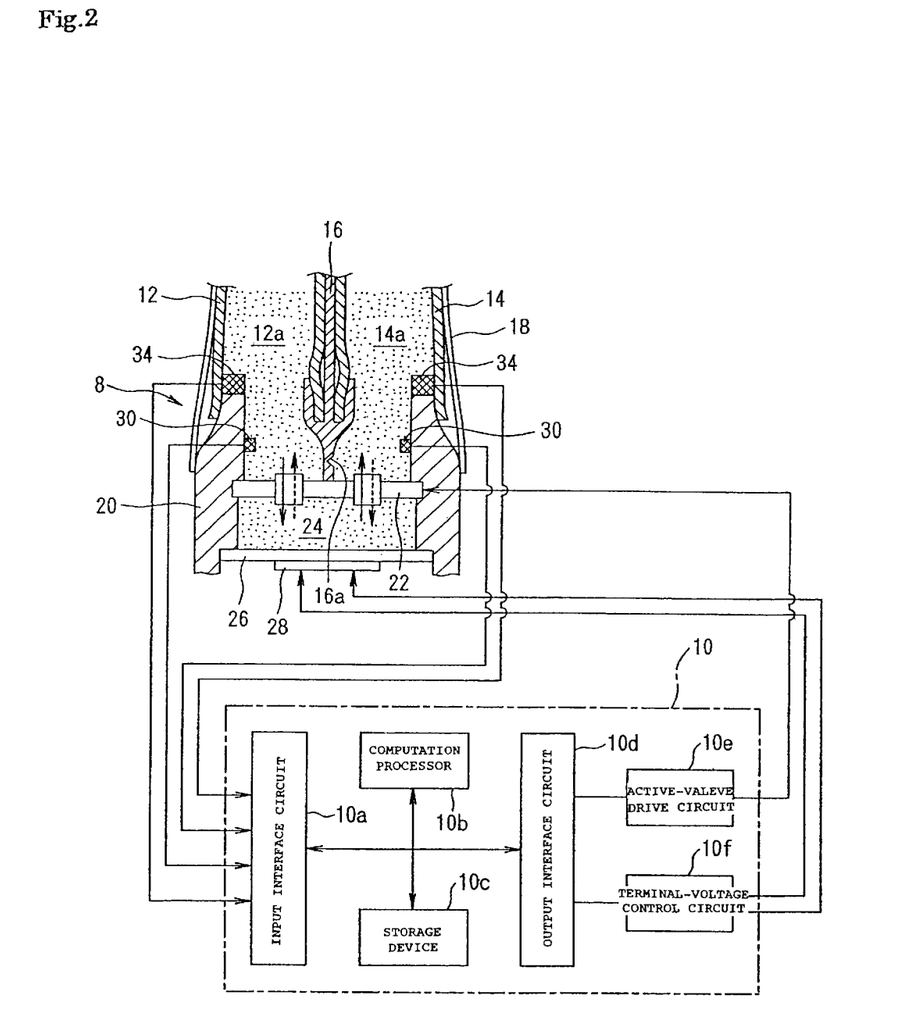
FIG. 2 is a sectional view and schematic of a pump unit and a pump driver according to the first embodiment.

The pump unit 8 is a piezoelectric diaphragm pump, for example. The pump unit 8 includes, as shown in FIG. 2, a cylindrical pump casing 20 integrally connected to a lower part of the movable unit 6 that seals fluid therein, an active valve 22 as a valve unit disposed in the pump casing 20 between the fluid chambers 12a and 14a of the tubes 12 and 14, respectively, a diaphragm 26 defining a pump fluid chamber 24 below the active valve 22, and a piezoelectric element 28 laminated on the diaphragm 26 at the bottom surface thereof.

The pump casing 20 is embedded in the fixture 2 made of a soft rubber. The piezoelectric element 28 is a known piezoelectric actuator which is formed with an element for producing a so-called piezoelectric effect. Lead zirconate titanate (PZT), which is a type of piezoelectric ceramics, is a typical material among various materials for piezoelectric actuators from crystal to a polymer. The piezoelectric element 28 is elongated by varying voltage applied thereto, thereby varying the shape of the diaphragm 26 and inner pressure of the pump fluid chamber 24.

The active valve 22 is provided with, for example, a solenoid selector-valve that selects a direction of the flow of the work fluid S between the two fluid chambers 12a and 14a. The active valve 22 operates with a current that controls opening and closing, which is supplied by a pump driver 10 which is described below.

The tubes 12 and 14 are each provided with a pressure sensor 30 that senses fluid pressure in the fluid chamber 12a and 14a, respectively. Data of the sensed fluid pressure are sent to the pump driver 10.

As shown in FIG. 1, an acoustic wave generator 32 is provided at a tip of each of the fluid chambers 12a and 14a. An acoustic wave sensor 34 is provided at the pump casing 20 side of each fluid chamber 12a or 14a. The acoustic wave sensor 34 receives acoustic waves generated by the acoustic wave generator 32. The acoustic waves sensed by each acoustic wave sensor 34 are sent to the pump driver 10.

As shown in FIG. 2, the pump driver 10 includes an input interface circuit 10a that reads signals from the pressure sensor 30 and the acoustic wave sensor 34 as determination values, a computation processor 10b that performs a predetermined computation to control driving of the pump unit 8 in accordance with a given program, a storage device 10c that includes RAMs, ROMs, and the like, an output interface circuit 10d that outputs an opening-and-closing control signal for the active valve 22 and a voltage-control signal for the piezoelectric element 28 which are obtained from the computation processor 10b, an active-valve drive circuit 10e that outputs an opening-and-closing control current to the active valve 22 in accordance with the opening-and-closing control signal outputted by the output interface circuit 10d, and a terminal-voltage control circuit 10f that outputs a terminal voltage to the piezoelectric element 28 in accordance with the voltage-control signal outputted by the output interface circuit 10d.

In the storage device 10c, values of varied operational forces of the movable unit 6 (forces of the movable unit 6 at which it holds objects), which are generated in accordance with the variations in fluid pressure in the fluid chambers 12a and 14a, are stored as a storage table. Amounts of displacement of the movable unit 6 (degrees of bend of the movable unit 6) in response to the variations in propagation time or in phase of acoustic waves are also stored as a storage table. The computation processor 10b performs a predetermined computation to control driving of the pump unit 8 with reference to the storage tables.

Figure 3:
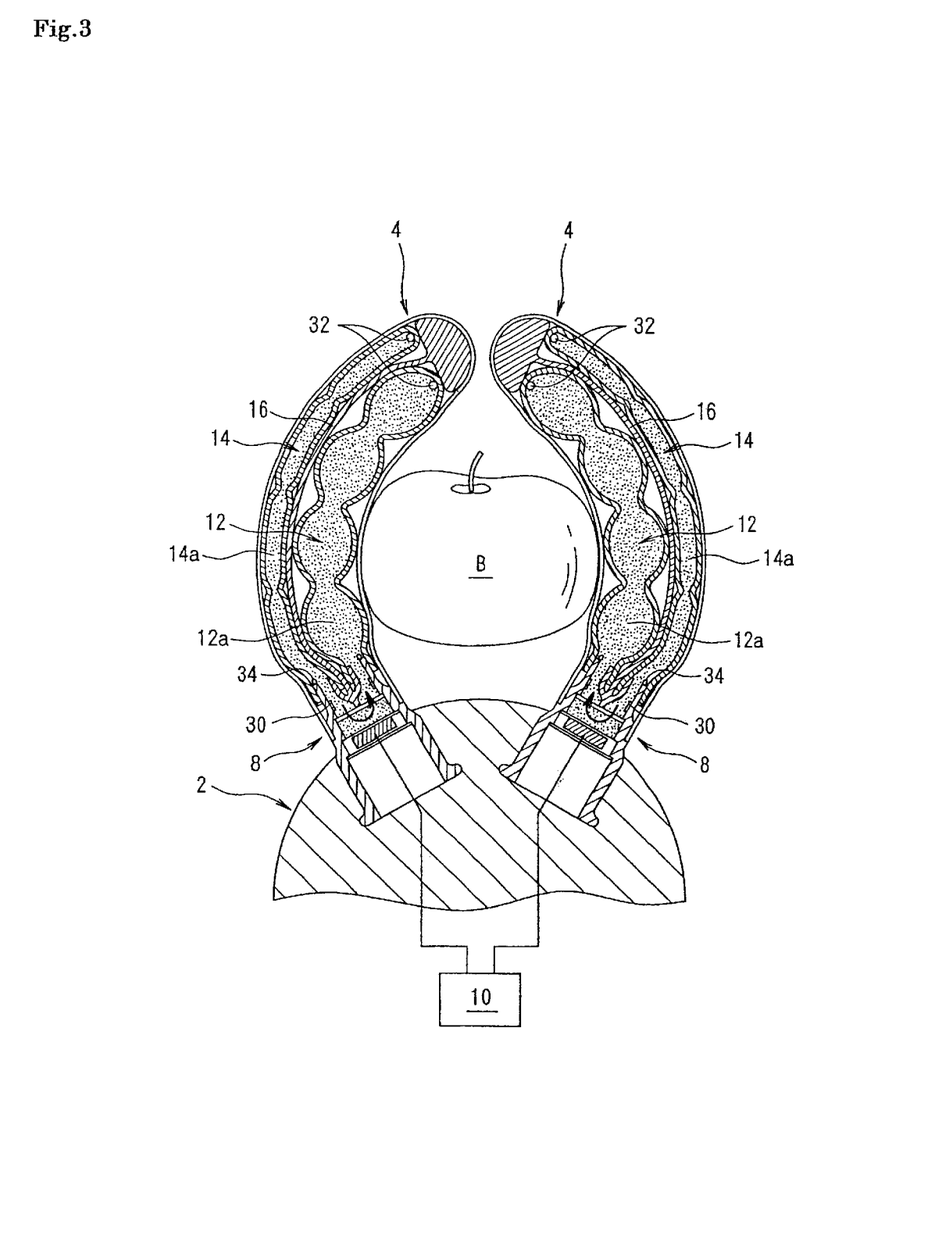
FIG. 3 is a sectional view showing the operation of the actuators according to the first embodiment.

FIG. 3 is an illustration showing a state in which a pair of the flexible actuators 4 holds a piece of fruit that has an irregular shape and that is likely to be broken (hereinafter referred to as a "substantially spherical object B"). The operation of the pair of flexible actuators 4 is briefly described below with reference to FIG. 3 and the above-described FIGS. 1 and 2. The movable unit 6 of each of the flexible actuators 4 includes the tube 12 which has the fluid chamber 12a at the side of the movable unit 6 which is brought into contact with the object B. An optimum value M of the operational force of the movable unit 6 at which the movable unit 6 can reliably hold the object B and an optimum value H of the displacement of the movable unit 6 are stored in advance in the storage device 10c of the pump driver 10.

Opening and closing of the active valve 22 are controlled by the opening-and-closing control current outputted by the pump driver 10 in such a manner that the fluid chamber 12a and the fluid chamber 14a individually communicate with the pump fluid chamber 24 alternately at predetermined intervals. At the same time, the piezoelectric element 28 is elongated with the terminal voltage outputted by the pump driver 10 when the fluid chamber 14a communicates with the pump fluid chamber 24, and the diaphragm 26 is thereby resiliently deformed to the lower side thereof so as to decrease the inner pressure of the pump fluid chamber 24, whereby the work fluid S in the fluid chamber 14a flows into the pump fluid chamber 24. The output of the terminal voltage from the pump driver 10 is suspended when the fluid chamber 12a communicates with the pump fluid chamber 24, thereby resiliently restoring the deformed diaphragm 26 and increasing the inner pressure of the pump fluid chamber 24, whereby the work fluid S in the pump fluid chamber 24 flows into the fluid chamber 12a. These operations are repeatedly performed by the pump unit 8, thereby transferring the work fluid S, in the fluid chamber 14a of the tube 14 which is not supposed to be in contact with the object B, into the fluid chamber 12a of the tube 12 which comes into contact with the object B, whereby the tube 14 which is not supposed to be in contact with the object B contracts and the tube 12 which comes into contact with the object B expands.

Since the expansion of the tube 12 in the longitudinal direction is restricted by the core 16, the tube 12 expands in the widthwise direction while bending the core 16, whereby the movable unit 6 is bent.

In FIG. 3, the movable unit 6, which is bending in a state in which a plurality of plane-contact portions of action (points at which forces are applied) are provided, gradually presses to hold the object B.

The computation processor 10b obtains an actual operational force and an amount of displacement of the movable unit 6 by referring to the fluid pressure in the fluid chamber 12a of the tube 12 which is determined by the pressure sensor 30, and the value of the propagation time or the phase of the acoustic waves, which has been received by the acoustic wave sensor 34 in the fluid chamber 12a and stored in the storage table. The operational force in this case is equal to a holding force. For example, when holding a piece of fruit or the like, a target value of a holding force is set in such a manner that the holding force to hold a larger piece of fruit is set to be a value that is slightly larger than a certain value as a reference value, and the holding force to hold a smaller piece of fruit is set to be a value that is slightly smaller than the reference value. In an operation of holding an object, the operational force quickly increases after the movable unit 6 comes into contact with the object. A target value M of a holding force (=operational force) is obtained from displacement of the movable unit 6 when the movable unit 6 comes into contact with the object, and the pump unit 8 is operated until the operational force becomes the target value M, whereby a target holding force can be obtained. With this arrangement of the flexible actuator 4 in which the movable unit 6 is integrally connected with the pump unit 8 which is a piezoelectric diaphragm pump, as described above, a compact and lightweight actuator can be provided.

The core 16 included in the movable unit 6 maintains the tubes 12 and 14 to be parallel with each other while the core 16 is bending, such that the core 16 restricts the longitudinal expansion of the tubes 12 and 14 and allows the widthwise expansion thereof, whereby the movable units 6 can be reliably bent in the same manner as fingers of a human being.

The tube 12, which is brought into contact with the object B, is made of a soft material. The movable unit 6 including the tube 12 comes into soft contact with the object B in a state in which a plurality of plane-contact portions of action are provided, and holds the object B without scratching the object B.

The pump casing 20 of the pump unit 8 is embedded in the fixture 2 which is made of a soft rubber. Therefore, no hard parts are exposed to the exterior, thereby holding the object B more safely.

When an excessive external force is applied to the movable unit 6, thereby increasing pressure to an abnormal level in one of the fluid chambers 12a and 14a, the inner pressure of the one of the fluid chambers 12a and 14a decreases because the fluid chambers 12a and 14a communicate with each other through the slit 16a of the core being released, thereby avoiding breakages of the tubes 12 and 14, whereby the movable unit 6 can be provided with a fail-safe system against an excessive external force.

The movable unit 6 is controlled, so that the object B can be held by an optimum force (operational force) of the movable unit 6 and at an optimum degree of bending (amount of displacement), by determining fluid pressure in the fluid chambers 12a and 14a by the pressure sensors 30 and determining propagation time or phase of acoustic waves generated in the fluid chambers 12a and 14a by the acoustic wave sensors 34. Therefore, the movable unit 6 can be operated at a high accuracy.

Figure 4:
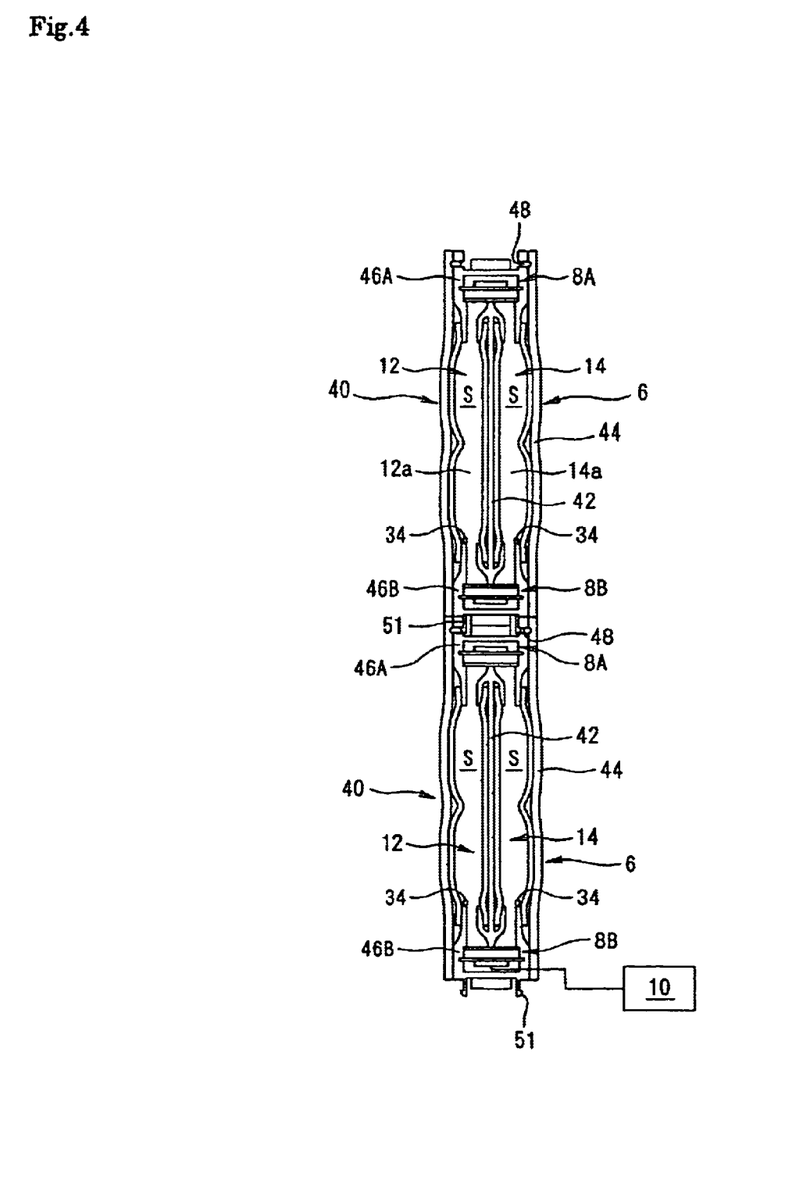
FIG. 4 is a plan view of a flexible actuator, according to a second embodiment of the present invention, used in a pet robot.

FIG. 4 shows a pair of flexible actuators 40 according to a second embodiment used in, for example, a pet robot or the like. The same components used in the flexible actuator 4 according to the first embodiment are referred to with the same reference numerals, for which description is omitted.

The pair of the flexible actuators 40 according to the present embodiment is connected to each other in series. Each flexible actuator 40 includes a movable unit 6, a pair of pump units 8A and 8B that are each connected to an end of the movable unit 6, and a pump driver 10 that drive-controls these pump units 8A and 8B.

The movable unit 6 includes a core 42 which maintains the two long and narrow tubes 12 and 14 in parallel to each other, and a cover 44 made of a polymer, which can absorb liquid, has flexibility, and covers the tubes 12 and 14.

Although the pump units 8A and 8B each have substantially the same shape as that of the pump unit 8 used in the first embodiment, the shape of a pump casing 46A or 46B formed in a cylinder differs from that of the first embodiment. That is, the pump casing 46A is provided with an annular concavity 48 formed in an inner periphery of the pump casing 46A, and the pump casing 46B is provided with a nail 50 protruding toward the outside in an axial direction. The flexible actuators 40 are connected to each other at the pump unit 8A of one of the flexible actuators 40 and the pump unit 8B of the other one of the flexible actuators 40, in such a manner that the pump unit 8A of the one of the flexible actuators 40 opposes the pump unit 8B of the other one of the flexible actuators 40, and the pump casing 46B is inserted into the pump casing 46A at the nail 50 of the pump casing 46B, while the nail 50 is being resiliently deformed, and the nail 50 is resiliently restored so as to mate with the annular concavity 48. A connected part between the pump unit 8A and the pump unit 8B serves as a connector for signal wiring and electric wiring. The annular concavity 48 and the nail 50 serve as release buttons to mount a pair of the flexible actuators 40 to each other and remove the same from each other through a one-touch operation. The pump casings 46A and 46B are covered by the cover 44 at the peripheries of the pump casings 46A and 46B.

The core 42 according to the present embodiment is formed with a plurality of signal wires and electrical wires. The signal wires and electrical wires are made of a flexible material, and restrict longitudinal expansion of the tubes 12 and 14 and allow widthwise expansion thereof. In contrast to the first embodiment, the fluid chamber 12a or 14a of the movable unit 6 is not provided with a pressure sensor and an acoustic wave generator, and a sonic sensor 34 is only provided at the pump unit 8B side. Acoustic waves sensed by the acoustic wave sensor 34 are sent to the pump driver 10.

The pump driver 10, according to the present embodiment, controls the operational force and the amount of displacement of each movable unit 6 by using a diaphragm 26 which forms each pump unit 8a or 8b.

That is, since a waveform of current at an applied voltage varies when pressure is applied to the diaphragm 26, signals of variation in the current produced by the diaphragm 26, which is applied with a given voltage, are inputted to an interface circuit 10a of the pump driver 10. A storage device 10c stores values of varied operational forces of the movable unit 6 according to the variation in the waveform of current as a storage table. A computation processor 10b performs a predetermined computation process to drive-control the pump units 8a and 8b by referring to the storage table of the operational forces of the movable units 6 and the waveforms of current.

Acoustic waves are generated when the diaphragm 26 operates. According to the present embodiment, the acoustic waves produced by the diaphragm 26 are sensed by the acoustic wave sensor 34. The computation processor 10b performs a predetermined computation process to drive-control the pump units 8a and 8b by referring to a storage table of the propagation time or the phase of the acoustic waves and the amount of displacement of the movable unit 6. The operational force and displacement of the movable unit 6 are controlled by using the pressure applied to and the acoustic waves generated by the diaphragm 26.

The operation of a pair of the thus formed flexible actuators 40 is described below.

The pump driver 10 outputs an opening-and-closing control current and a terminal voltage to each of a pair of the pump units 8A and 8B of the respective flexible actuators 40, whereby work fluid S flows between the fluid chambers 12a and 14a of each movable unit 6 and the movable unit 6 is bent.

The computation processor 10b obtains an actual operational force and displacement of the movable unit 6 by referring to the variation in current generated by the diaphragm 26 and the storage table of the propagation time or the phase of the acoustic waves received from the acoustic wave sensor 34 which senses the acoustic waves generated by the diaphragm 26.

The operation of the pump units 8A and 8B is suspended when the operational force of the movable unit 6 reaches the optimum value M and the amount of displacement of the movable unit 6 reaches the optimum value H.

When the flexible actuators 40 are used as, for example, arms of a pet robot, the movable units 6 keep moving until they have an amount of displacement of the target value M regardless of resistance produced by being in contact with a human being. Therefore, the operation of the pump units 8A and 8B may be suspended when the operational force reaches a predetermined value that is less than the target value M.

Each movable unit 6 of the flexible actuator 40 includes the pair of the pump units 8A and 8B that transfer the work fluid S between the fluid chamber 14a and the fluid chamber 12a, whereby the flexible actuators 40, which can move quickly by increasing the speed of bending motion of the movable units 6, are obtainable.

The core 42 of each movable unit 6 serves as signal wires and electrical wires which connect between the respective pump units 8A and 8B and the pump driver 10 and are disposed in the movable unit 6, thereby preventing the signal wires and electrical wires from becoming damaged and thereby avoiding electrical shocks and the like.

The pump units 8A and 8B together with the movable unit 6 are covered by the soft cover 44. Therefore, the flexible actuators 40 provide a soft-touch sensation, such as of a living creature, because of the soft cover 44. Since the cover 44 is made of a polymer, the cover 44 absorbs the work fluid S and the work fluid S does not leak to the exterior, even when the work fluid S leaks from the tube 12 or 14.

The annular concavity 48 and the nail 50, serving as release buttons, are provided at the respective ends (the pump units 8A and 8B, respectively) of each flexible actuator 40, whereby a pair of the flexible actuators 40 can be mounted to, and removed from, each other through a one-touch operation and thereby provide a device that is easily dismountable with respect to the actuators.

The operational forces and the displacement of the movable units 6 are controlled by determining pressure from the variation in driving current caused by the pressure applied to the diaphragm 26 and by using the acoustic waves generated by the diaphragm 26. Therefore, a simple control mechanism is obtainable.

Figure 5:
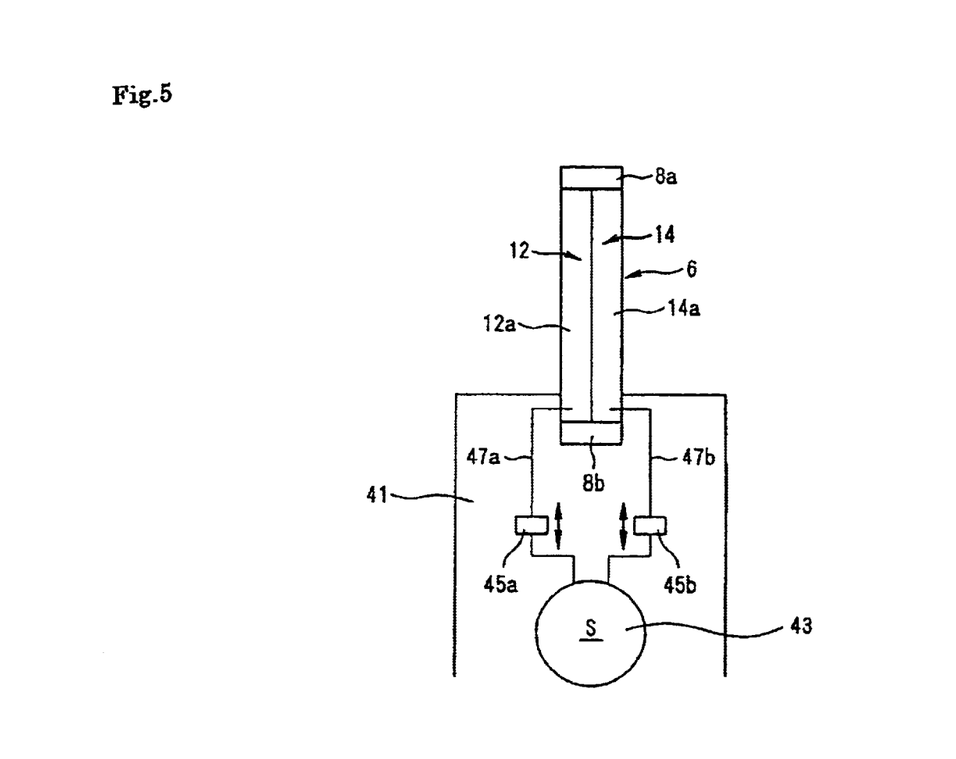
FIG. 5 is a schematic of a modified example of the flexible actuator according to the second embodiment.

FIG. 5 is a conceptual diagram of a modified example of the second embodiment.

According to the modified example, a device body (for example, a body of a home robot) 41 is provided with a reservoir 43 containing a predetermined amount of the work fluid S. The work fluid S in the reservoir 43 can be supplied to the two fluid chambers 12a and 14a of the movable unit 6. The reservoir 43 is connected to the two fluid chambers 12a and 14a, respectively, with pipes 47a and 47b therebetween, respectively, which are provided with pump units 45a and 45b, respectively.

With this arrangement, the work fluid S in the reservoir 43 is supplied into the fluid chambers 12a and 14a by operating the pump units 45a and 45b, respectively, and the inner pressure of the fluid chambers 12a and 14a is thereby increased, whereby the movable unit 6 can be made to be rigid. The strength of the actuator can be increased by the above-described operation, which differs from that (bending motion) in which the pump unit 8A and 8B operate, and the actuator can move into a state in which, for example, a pet robot is tense.

Figure 6:
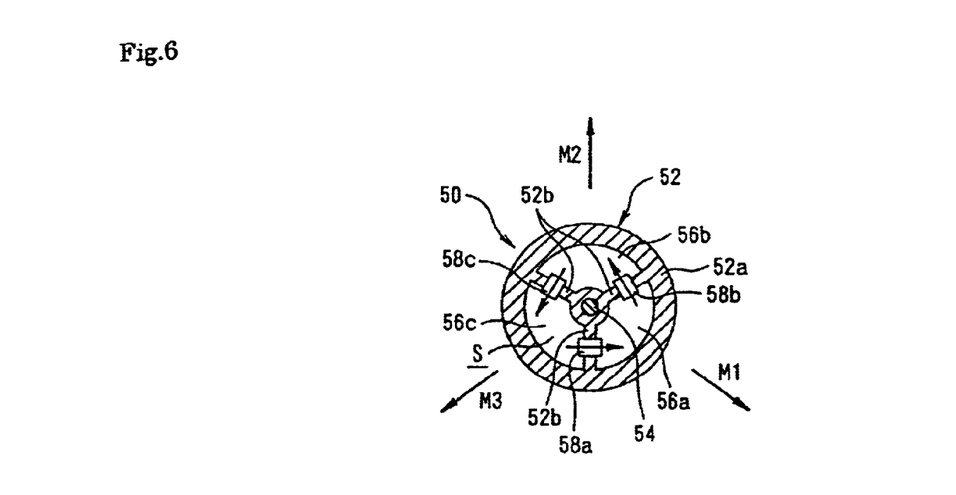
FIG. 6 is a sectional view of a flexible actuator according to a third embodiment of the present invention.

FIG. 6 is a cross-sectional view of a flexible actuator 50 according to a third embodiment A movable unit 52 according to the present embodiment includes a flexible core 54 that is embedded in an axial part of the movable unit 52, a hollow cylinder 52a made of a flexible elastic material and provided with a space around the periphery of the core 54, and three partition walls 52b which extend in the space in the hollow cylinder 52a in a longitudinal direction thereof and define first, second, and third fluid chambers 56a, 56b, and 56c. Work fluid S is sealed in the first, second, and third fluid chambers 56a, 56b, and 56c. The core 54 restricts expansion of the movable unit 52 in a longitudinal direction thereof.

The three partition walls 52b are individually provided with first, second, and third pump units 58a, 58b, and 58c. The first, second, and third pump units 58a, 58b, and 58c are each formed with a unidirectional-flow-type pump which transfers the work fluid S in one direction. That is, the first pump unit 58a transfers the work fluid S from the third fluid chamber 56c to the first fluid chamber 56a, the second pump unit 58b transfers the work fluid S from the first fluid chamber 56a to the second fluid chamber 56b, and the third pump unit 58c transfers the work fluid S from the second fluid chamber 56b to the third fluid chamber 56c.

In the thus formed flexible actuator 50, the first pump unit 58a is operated by controlling driving of a pump driver (not shown) in order to bend the movable unit 52 in a direction M1. When the first pump unit 58a operates, the work fluid S is transferred from the third fluid chamber 56c to the first fluid chamber 56a, thereby increasing inner pressure of the first fluid chamber 56a, and the third pump unit 58c is operated so that the inner pressure of the second fluid chamber 56b and the third fluid chamber 56c becomes the same. By this operation, the movable unit 52, of which expansion in the longitudinal direction is restricted by the core 54, is bent in the direction M1 while bending the core 54.

In order to bend the movable unit 52 in a direction M2, the second pump unit 58b is operated so that the work fluid S is transferred from the first fluid chamber 56a to the second fluid chamber 56b, thereby increasing inner pressure of the second fluid chamber 56b, and the first pump unit 58a is operated so that the inner pressure of the third fluid chamber 56c and the first fluid chamber 56a becomes the same.

In order to bend the movable unit 52 in a direction M3, the third pump unit 58c is operated so that the work fluid S is transferred from the second fluid chamber 56b to the third fluid chamber 56c, thereby increasing inner pressure of the third fluid chamber 56c, and the second pump unit 58b is operated so that the inner pressure of the first fluid chamber 56a and the second fluid chamber 56b becomes the same.

The flexible actuator 50 according to the present embodiment is provided with the three unidirectional-flow-type pump units 58a, 58b, and 58c, each being capable of transferring the work fluid S between two fluid chambers. The inner pressure of one of the fluid chambers is increased by reducing the inner pressure of the other fluid chambers by operating one of these pump units, thereby bending the movable unit 52, whereby a flexible actuator having a simple configuration can be provided.

Figure 7:
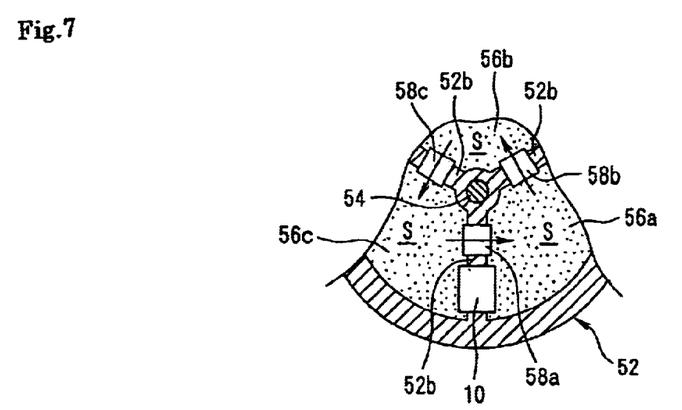
FIG. 7 is a sectional view of a significant portion of a flexible actuator according to a fourth embodiment of the present invention.

A flexible actuator according to a fourth embodiment is shown in FIG. 7, which is a modified example of the flexible actuator 50 according to the third embodiment.

According to the present embodiment, a movable unit 52 is provided with a pump driver 10 that is embedded in a given partition wall 52b of the movable unit 52, to control driving of first, second, and third pump units 58a, 58b, and 58c.

With this arrangement in which the pump driver 10 is disposed in the movable unit 52, work fluid S is maintained in contact with the pump driver 10, whereby heat generated by the pump driver 10 can be absorbed by the work fluid S, thereby providing an effect of cooling the pump driver 10. The flexible actuator 50 can be made more compact because the pump driver 10 is disposed in the movable unit 52.

Figure 8:
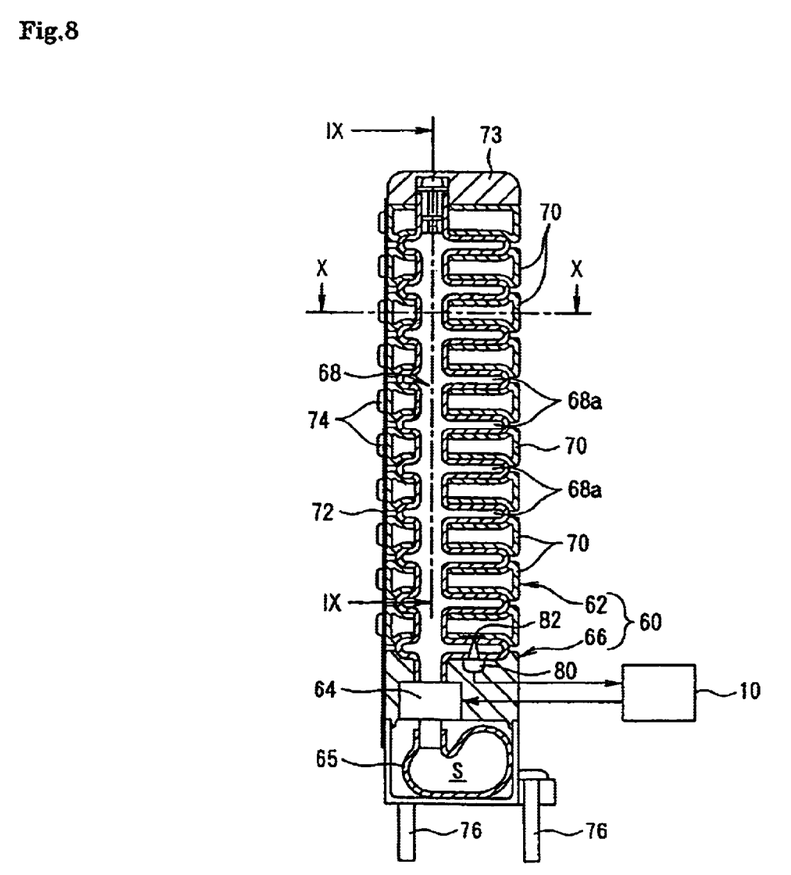
FIG. 8 is a longitudinal-sectional view of a flexible actuator according to a fifth embodiment of the present invention.

FIG. 8 shows a flexible actuator 60 according to a fifth embodiment of the present invention. Components for the fifth embodiment, which are the same as those used in the other embodiments, are referred to with the same reference numerals, for which description is omitted.

The flexible actuator 60 according to the present embodiment includes a movable unit 62, a base unit 66 which is connected to the movable unit 62 at a lower part thereof and includes a pump unit 64, and a pump driver 10 to control driving of the pump unit 64.

The movable unit 62 includes a long and narrow tube 68 which has a plurality of swelling parts 68a, a plurality of partition walls 70 that vertically sandwich each swelling part 68a, and a core 72 that maintain the partition walls 70 to be vertically parallel to each other.

Figure 9:
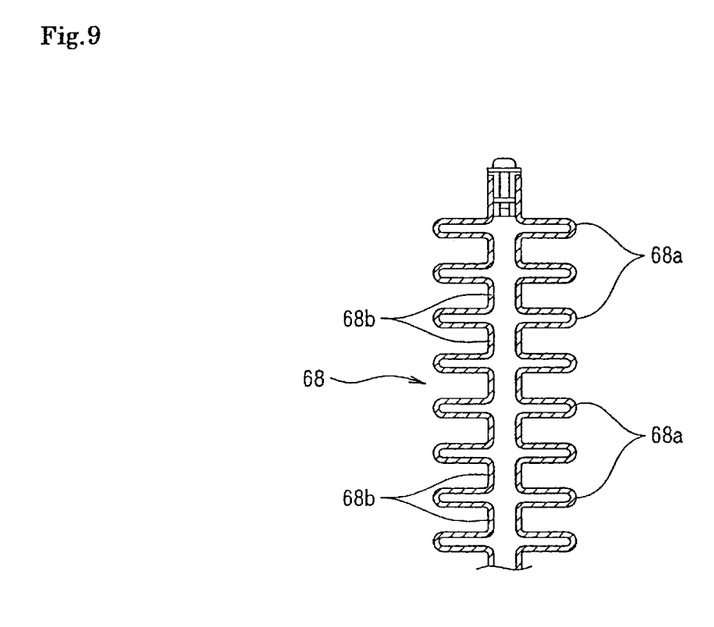
FIG. 9 is a sectional view of a tube which is a component of the flexible actuator according to the fifth embodiment.

The tube 68 is made of a semitransparent, soft, and elastic material. The tube 68 includes the flat swelling parts 68a that are disposed in a longitudinal direction of the tube 68 at a predetermined distance from each other and with a narrowed part 68b between each swelling part 68a, as shown in FIG. 9. Each swelling part 68a serves as a fluid chamber according to the present invention. Work fluid S, such as silicone oil, is sealed in the tube 68 including the swelling parts 68a.

Figure 10:
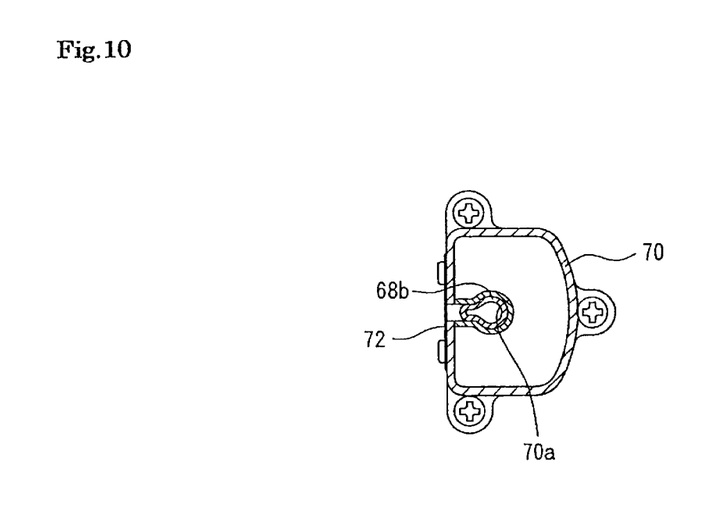
FIG. 10 is a sectional view taken along plane X—X of the flexible actuator shown in FIG. 8.

Each partition wall 70 is made of a synthetic resin or the like and is a box-shaped member formed in a rectangle in plan view. In FIG. 10, each narrowed part 68b of the tube 68 is inserted to a concavity 70a formed at the side of the core 72 of the partition wall 70, and each swelling part 68a of the tube 68 is sandwiched by the partition walls 70 individually disposed at the upper and lower sides of the swelling part 68a. A cap 73 made of a synthetic resin is disposed on an uppermost partition wall 70.

Figure 11:
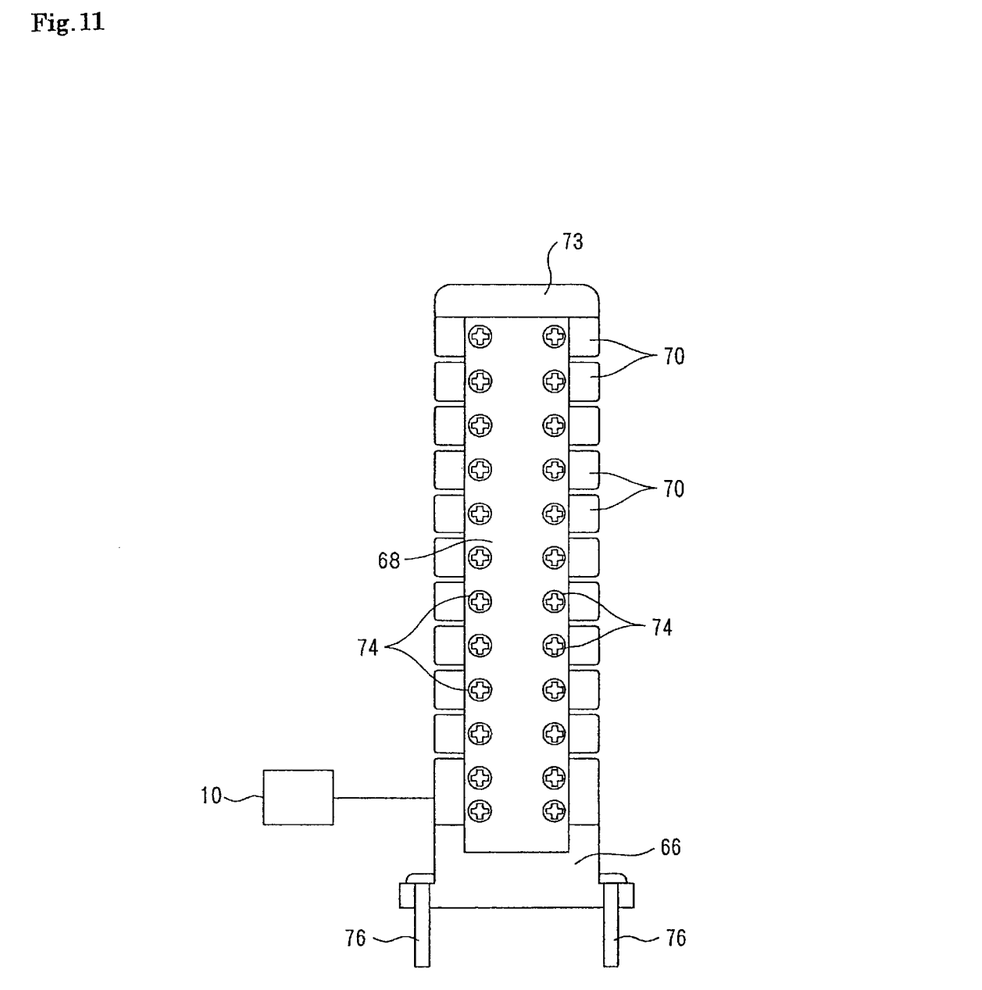
FIG. 11 is a plan view from the side of a core of the flexible actuator according to the fifth embodiment.

As shown in FIG. 11, the core 72 is a planar member which is flexible and is made of, for example, a synthetic resin. The partition walls 70 are fixed to the core 72 by using a plurality of screws 74 such that the partition walls 70 are vertically separated from each other. The core 72 is fixed to the base unit 66 at the lower end of the core 72. A soft sheet (not shown) covers the overall core 72 mounted with the screws 74.

A base unit 66 is fixed to a fixture (not shown) via fixing screws 76. The pump unit 64 that is included in the base unit 66 has a configuration similar to that of the device body 41 shown in FIG. 5. The pump unit 64 is connected to a lower opening of the tube 68 and to a reservoir 65 which stores a predetermined amount of the work fluid S. The pump unit 64 supplies the work fluid S stored in the reservoir 65 into the tube 68 and returns the work fluid S from the tube 68 to the reservoir 65.

The base unit 66 is provided with a light generating/receiving member 80 that includes a light generating element, such as a light emitting diode, and a light receiving element, such as a photodiode. A reflector 82, such as a mirror, is provided at a lower part of the lowermost partition wall 70 which opposes the light generating/receiving member 80 across the swelling part 68a of the tube 68. The light generating/receiving member 80 sends to the pump driver 10 determination data of the amount of light which has been emitted to the reflector 82 (amount of received light).

The pump 10 is provided with an input interface circuit, a computation processor, a storage device, an output interface circuit, and the like. The pump driver 10 has a similar configuration to that of the pump driver shown in FIG. 2. The storage device stores, as a storage table, values of displacement of the movable unit 62 which vary according to the variation in fluid pressure in the tube 68 (fluid chambers). The storage device also stores, as a storage table, values of displacement of the movable unit 62 corresponding to the variation in the received-light amount inputted from the light generating/receiving member 80. The computation processor performs a predetermined computation to control driving of the pump unit 64 by referring to the storage tables.

A pair of the flexible actuators 60 described above operates as follows.

Figure 12:
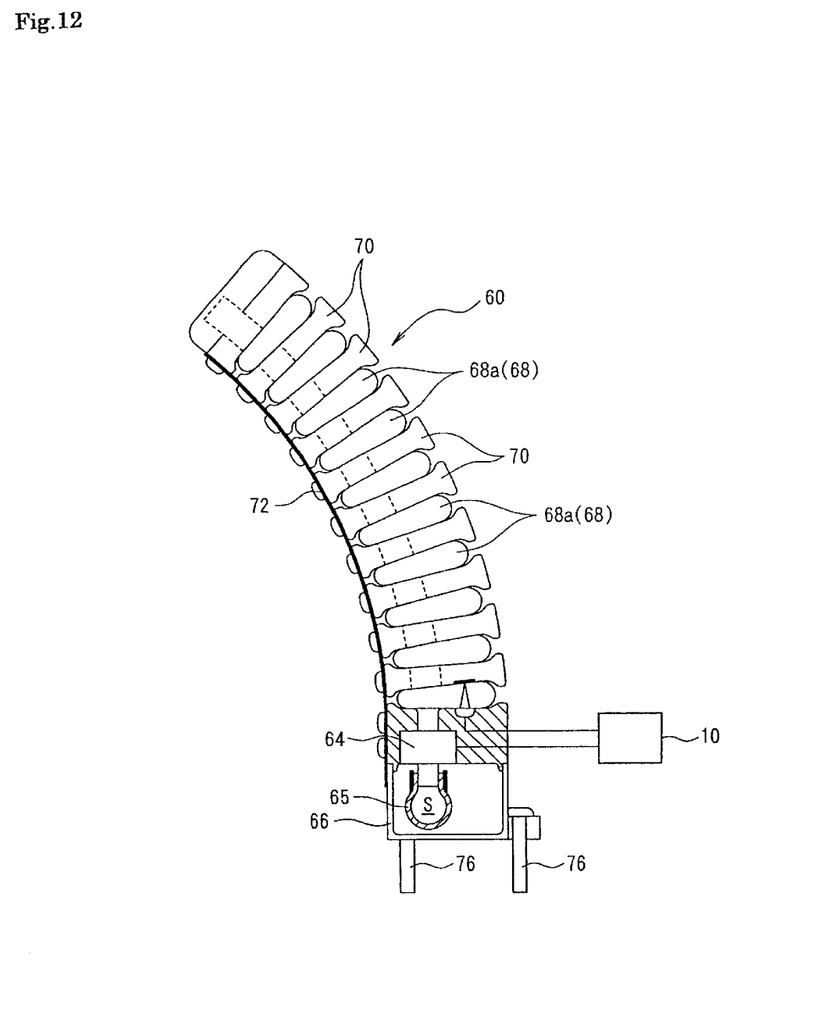
FIG. 12 is a plan view of the flexible actuator according to the fifth embodiment, the flexible actuator being bent.

The pump driver 10 outputs current to control the pump units 64 of the respective flexible actuators 60. When each pump unit 64 operates so as to supply the work fluid S from the reservoir 65 to the tube 68, the work fluid S flows into the swelling parts 68a of the tube 68, thereby increasing the volume of each swelling part 68a. As the volume of each swelling part 68a increases, the partition walls 70 sandwiching the swelling part 68a individually move upward and thereby bend the core 72 into a state in which each flexible actuator 60 is bent, as shown in FIG. 12. When the pump unit 64 returns the work fluid S from the tube 68 to the reservoir 65, the volume of each swelling part 68a of the tube 68 decreases and the partition walls 70 are individually restored to the original positions by a resiliently restoring force of the core 72, whereby the flexible actuator 60 becomes straight, as shown in FIG. 8.

In this case, when the partition walls 70, which vertically sandwich each swelling part 68a, move upward, the relative angle and the distance between the light generating/receiving member 80 and the reflector 82 are changed, whereby the received-light amount to be sent to the pump driver 10 decreases. The computation processor of the pump driver 10 confirms an actual amount of displacement of the movable unit 62 by referring to the storage tables of the received-light amount and the amount of displacement of the movable unit 62, and determines whether the amount of displacement reaches a target value. When the actual amount of displacement of the movable unit 62 has not reached the target value, the work fluid S is transferred between the tube 68 and the reservoir 65 by operating the pump unit 64. When the amount of displacement of the movable unit 62 reaches the target value, the operation of the pump unit 64 is suspended.

In the thus formed flexible actuator 60, the partition walls 70 that vertically sandwich each swelling part 68a are moved vertically by increasing or decreasing the volume of the swelling parts 68a of the tube 68 by operating the pump unit 64, thereby bending the core 72 so as to deform the movable unit 62. A flexible actuator, which can be moved quickly by increasing the speed of movement of the movable unit 62, is thereby provided.

When the movable unit 62 is bending, the light generating/receiving member 80 inputs data of variation in the received-light amount to the pump driver 10, and the pump driver 10 controls according to the variation in the received-light amount so that the movable unit 62 bends by an optimum amount of displacement (degree of bending), whereby the movable unit 62 can operate at a high accuracy.

When the work fluid S sealed in pressure chambers, according to the first to fifth embodiments, is heated by a heating device, for example, a heating wire, a flexible actuator for a pet robot, which gives a warm sensation, such as that of a living creature, can be provided.

When the flexible actuator is provided with a voice recognition function (for example, a function to suspend bending motion when a user says "stop"), a safer flexible actuator can be provided.

When the movable unit performs actions of a robot hand, such as holding a soft object, such as a piece of fruit, or a pet robot which acts like a living creature in connection with human beings, an actuator having a soft end part which corresponds to a hand can have an enhanced adaptability to safety and holding operations. For enhancing adaptability to safety and holding operations, a fluid actuator is most suitable. However, in a known fluid actuator which was not provided with a built-in pump unit, a number of pressure tubes were necessarily provided toward the tip of the actuator, and thus arms and the like could not move freely. Although liquid was preferably used as a fluid so as to enhance efficiency because it is not provided with compressibility, there was a risk in that damages could occur and would be great when the fluid leaked out because of a large amount of fluid disposed in piping in a known centralized-type pump unit. In particular, there was another risk in that holes were formed in a soft actuator, of which a countermeasure had not been achieved by a known technology.

In a pump-integrated flexible actuator according to the present invention, the movable unit serves to press and hold an object without scratching the object because the movable unit is provided with a tube made of a soft and elastic material, and disposed at the side of the movable unit which is brought into contact with the object when the movable unit acts on the object with a pressing force and a holding force.

When the actuator is provided with a reservoir that stores a predetermined amount of fluid and a supply device to control supply of the fluid stored in the reservoir to the fluid chambers of the movable unit, the movable unit can be made to be rigid by increasing the inner pressure by supplying the fluid stored in the reservoir to the fluid chambers by operating the supply device. Therefore, when the actuator is used as a component of, for example, a pet robot, the pet robot can move into a tense mode with the movable unit becoming rigid beside of bending movement produced by a pump unit. Since a movable unit is covered by an outer cover having a liquid-absorbing function, the outer cover absorbs liquid so that the liquid does not leak to the exterior, even when the liquid leaks from the movable unit.

When a plurality of the fluid chambers are each provided with a pressure sensor, and the pump driver computes an actual operational force of the movable unit according to determination by the pressure sensors that control driving of the pump unit, the pressure sensors determine the pressure of the fluid in the fluid chambers and the movable unit is controlled so as to be operated by an optimum operational force according to the determination of the pressure, thereby operating the movable unit at a high accuracy.

When a plurality of the fluid chambers are each provided with an acoustic wave generator that generates acoustic waves and an acoustic wave sensor that senses the acoustic waves, and the pump driver computes an actual amount of displacement of the movable unit according to determination by the acoustic sensors to control driving of the pump unit, the acoustic wave sensors determine the propagation time or the phase of the acoustic waves generated in the fluid chamber, and the movable unit is controlled so as to be operated by an optimum amount of displacement according to the determination by the acoustic wave sensors, thereby operating the movable unit at a high accuracy.

When the movable unit is provided with a light generator and a light receiver that oppose each other, or a light generating/receiving member and a reflector that oppose each other, and an actual operational force of the movable unit is computed according to determination by the light receiver or the light generating/receiving member to control driving of the pump unit, the operational force and the amount of displacement of the movable unit is controlled by using the light generator and the light receiver or the light generating/receiving member and the reflector, thereby providing a simple control mechanism.

What is claimed is:

1. A pump-integrated flexible actuator, comprising:
   a movable unit provided with a plurality of flexible fluid chambers having fluid sealed therein, the movable unit being movable with the fluid chambers being deformed by a transfer of the fluid between the fluid chambers;
   a pump unit integrated with the movable unit, that transfers the fluid between the plurality of fluid chambers;
   a pump driver that controls driving of the pump unit; and
   a soft member that covers the pump unit.

2. A pump-integrated flexible actuator, comprising:
   a movable unit provided with a plurality of flexible fluid chambers having fluid sealed therein, the movable unit being movable with the fluid chambers being deformed by a transfer of the fluid between the fluid chambers;
   a pump unit integrated with the movable unit, that transfers the fluid between the plurality of fluid chambers; and
   a pump driver that controls driving of the pump unit,
   the fluid sealed in the fluid chambers being a liquid, and an outer cover having a liquid-absorbing function covers the movable unit at the periphery thereof.

3. A pump-integrated flexible actuator, comprising:
   a movable unit provided with a plurality of flexible fluid chambers having fluid sealed therein, the movable unit being movable with the fluid chambers being deformed by a transfer of the fluid between the fluid chambers;
   a pump unit integrated with the movable unit, that transfers the fluid between the plurality of fluid chambers;
   a pump driver that controls driving of the pump unit; and
   a depressurization mechanism which reduces inner pressure of one of the plurality of fluid chambers by having the plurality of fluid chambers communicate with each other when the inner pressure of the one of the plurality of fluid chambers increases to an abnormal level.

4. A pump-integrated flexible actuator, comprising:
   a movable unit provided with a plurality of flexible fluid chambers having fluid sealed therein, the movable unit being movable with the fluid chambers being deformed by a transfer of the fluid between the fluid chambers;
   a pump unit integrated with the movable unit, that transfers the fluid between the plurality of fluid chambers;
   a pump driver that controls driving of the pump unit,
   the movable unit being provided with at least one long and narrow deformable tube forming the plurality of fluid chambers having fluid sealed therein, and a flexible core disposed parallel to the tube, to restrict expansion of the tube in a longitudinal direction thereof; and
   the core being formed with a signal wire or an electrical wire connected between the pump unit and the pump driver.

5. A pump-integrated flexible actuator, comprising:
   a movable unit provided with a plurality of flexible fluid chambers having fluid sealed therein, the movable unit being movable with the fluid chambers being deformed by a transfer of the fluid between the fluid chambers;
   a pump unit integrated with the movable unit, that transfers the fluid between the plurality of fluid chambers; and
   a pump driver that controls driving of the pump unit,
   the pump driver being disposed in the movable unit which has liquid sealed therein so that the pump driver is in contact with the liquid.

6. A pump-integrated flexible actuator, comprising:
   a movable unit provided with a plurality of flexible fluid chambers having fluid sealed therein, the movable unit being movable with the fluid chambers being deformed by a transfer of the fluid between the fluid chambers;
   a pump unit integrated with the movable unit, that transfers the fluid between the plurality of fluid chambers;
   a pump driver that controls driving of the pump unit; and
   a reservoir that stores a predetermined amount of fluid, and a supply device that controls supply of the fluid stored in the reservoir to each fluid chamber of the movable unit.

7. A pump-integrated flexible actuator, comprising:
   a movable unit provided with a plurality of flexible fluid chambers having fluid sealed therein, the movable unit being movable with the fluid chambers being deformed by a transfer of the fluid between the fluid chambers;
   a pump unit integrated with the movable unit, that transfers the fluid between the plurality of fluid chambers; and
   a pump driver that controls driving of the pump unit, and
   two pump units being integrated with the movable unit at respective longitudinal ends of the movable unit and the two pump units simultaneously operating to transfer fluid between the plurality of fluid chambers.

8. The pump-integrated flexible actuator according to claim 7, each pump unit being provided with a detachable connecting part such that when a pair of the movable units are connected to each other in series, the movable unit is connected to the other movable unit at the pump unit of each movable unit.

9. A pump-integrated flexible actuator, comprising:
   a movable unit provided with a plurality of flexible fluid chambers having fluid sealed therein, the movable unit being movable with the fluid chambers being deformed by a transfer of the fluid between the fluid chambers;
   a pump unit integrated with the movable unit, that transfers the fluid between the plurality of fluid chambers; and a pump driver that controls driving of the pump unit;

the pump unit including a diaphragm which defines a pump fluid chamber between an end of the movable unit and the pump unit.

10. The pump-integrated flexible actuator according to claim 9, a piezoelectric element being laminated on the diaphragm.

11. A pump-integrated flexible actuator, comprising:

a movable unit provided with a plurality of flexible fluid chambers having fluid sealed therein, the movable unit being movable with the fluid chambers being deformed by a transfer of the fluid between the fluid chambers;

a pump unit integrated with the movable unit, that transfers the fluid between the plurality of fluid chambers; and a pump driver that controls driving of the pump unit;

the pump unit being provided with a valve that sets a direction of the transfer of fluid between one tube forming the fluid chamber and another tube forming the other fluid chamber via a pump fluid chamber.

12. A pump-integrated flexible actuator, comprising:

a movable unit provided with a plurality of flexible fluid chambers having fluid sealed therein, the movable unit being movable with the fluid chambers being deformed by a transfer of the fluid between the fluid chambers;

a pump unit integrated with the movable unit, that transfers the fluid between the plurality of fluid chambers; and a pump driver that controls driving of the pump unit;

the plurality of fluid chambers each being provided with a pressure sensor, and the pump driver computing an actual operational force of the movable unit according to a determination by the pressure sensors and controlling driving of the pump unit.

13. A pump-integrated flexible actuator, comprising:

a movable unit provided with a plurality of flexible fluid chambers having fluid sealed therein, the movable unit being movable with the fluid chambers being deformed by a transfer of the fluid between the fluid chambers;

a pump unit integrated with the movable unit, that transfers the fluid between the plurality of fluid chambers; and a pump driver that controls driving of the pump unit;

the plurality of fluid chambers each being provided with an acoustic wave generator that generates acoustic waves and an acoustic wave sensor that senses the acoustic waves, and the pump driver computing an actual amount of displacement of the movable unit according to determination by the acoustic wave sensors and controlling driving of the pump unit.

14. The pump-integrated flexible actuator according to claim 13, the pump driver including a table that computes an operational force and displacement of the movable unit from the determined acoustic waves and pressure.

15. A pump-integrated flexible actuator, comprising:

a movable unit provided with a plurality of flexible fluid chambers having fluid sealed therein, the movable unit being movable with the fluid chambers being deformed by a transfer of the fluid between the fluid chambers;

a pump unit integrated with the movable unit, that transfers the fluid between the plurality of fluid chambers; and a pump driver that controls driving of the pump unit;

the pump unit including a diaphragm which defines a pump fluid chamber, variation in current generated when a pressure is applied to the diaphragm which has been applied with a voltage being inputted to the pump driver, and the pump driver computing an actual operational force of the movable unit according to determination of the variation in current for controlling driving of the pump unit.

16. A pump-integrated flexible actuator, comprising:

a movable unit provided with a plurality of flexible fluid chambers having fluid sealed therein, the movable unit being movable with the fluid chambers being deformed by a transfer of the fluid between the fluid chambers;

a pump unit integrated with the movable unit, that transfers the fluid between the plurality of fluid chambers; and a pump driver that controls driving of the pump unit;

the pump unit including a diaphragm which defines a pump fluid chamber, a plurality of the fluid chambers each being provided with an acoustic wave sensor that senses acoustic waves generated by the diaphragm, and the pump driver computing an actual amount of displacement of the movable unit according to determination by the acoustic wave sensors for controlling driving of the pump unit.

17. A pump-integrated flexible actuator, comprising:

a movable unit provided with a plurality of flexible fluid chambers having fluid sealed therein, the movable unit being movable with the fluid chambers being deformed by a transfer of the fluid between the fluid chambers;

a pump unit integrated with the movable unit, that transfers the fluid between the plurality of fluid chambers; and a pump driver that controls driving of the pump unit;

the movable unit including a light generator and a light receiver that oppose each other, or a light generating/receiving member and a reflector that oppose each other, and an actual operational force of the movable unit being computed in accordance with determination by either the light receiver or the light generating/receiving member so that drive of the pump unit is controlled.

18. The pump-integrated flexible actuator according to claim 17, the pump driver including a table that computes an operational force and displacement of the movable unit from an amount of light which is determined by the light receiver or the light generating/receiving member.

* * * * *